(12) United States Patent
Ono et al.

(10) Patent No.: US 10,055,073 B2
(45) Date of Patent: Aug. 21, 2018

(54) TOUCH SCREEN, TOUCH PANEL, DISPLAY, AND ELECTRONIC APPARATUS

(71) Applicant: Mitsubishi Electric Corporation, Tokyo (JP)

(72) Inventors: Takeshi Ono, Tokyo (JP); Tatsuya Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 15/099,627

(22) Filed: Apr. 15, 2016

(65) Prior Publication Data

US 2016/0334933 A1 Nov. 17, 2016

(30) Foreign Application Priority Data

May 13, 2015 (JP) .................................. 2015-097875

(51) Int. Cl.
*G06F 3/045* (2006.01)
*G06F 3/044* (2006.01)

(52) U.S. Cl.
CPC .... *G06F 3/044* (2013.01); *G06F 2203/04107* (2013.01); *G06F 2203/04112* (2013.01)

(58) Field of Classification Search
CPC ...................... G06F 3/044; G06F 3/042; G06F 2203/04107; G06F 2203/04112; G06F 3/0418
See application file for complete search history.

(56) References Cited

U.S. PATENT DOCUMENTS

| 5,844,506 A | 12/1998 | Binstead |
| 6,137,427 A | 10/2000 | Binstead |
| 6,452,514 B1 | 9/2002 | Philipp |
| RE40,867 E | 8/2009 | Binstead |
| 2011/0025639 A1* | 2/2011 | Trend ...................... G06F 3/044 345/174 |
| 2013/0242485 A1 | 9/2013 | Ohtani et al. |

(Continued)

FOREIGN PATENT DOCUMENTS

| JP | 9-511086 A | 11/1997 |
| JP | 2003-526831 A | 9/2003 |
| JP | 2010-277461 A | 12/2010 |

(Continued)

*Primary Examiner* — Towfiq Elahi
(74) *Attorney, Agent, or Firm* — Studebaker & Brackett PC

(57) ABSTRACT

A touch screen includes a column-direction wire and a row-direction wire. The column-direction wire and the row-direction wire three-dimensionally intersect each other in a region that is a detection cell. At least one of the column-direction wire and the row-direction wire has an end portion whose width is larger than a width of another portion of the wire, the end portion being a wire-end expansion portion. The wire-end expansion portion is provided so as to be located outside an edge of an outermost column-direction wire and an outermost row-direction wire that are disposed on the outermost side of a detectable area formed of a plurality of the column-direction wires and a plurality of the row-direction wires. The column-direction wire and the row-direction wire each have a mesh structure in which a plurality of conductor wires are disposed in a mesh pattern. The wire-end expansion portion has the mesh structure.

9 Claims, 14 Drawing Sheets

(56) References Cited

U.S. PATENT DOCUMENTS

2015/0242013 A1* 8/2015 Ono .................. G06F 3/044
                                                    345/174
2015/0378484 A1   12/2015 Orita et al.

FOREIGN PATENT DOCUMENTS

| JP | 2012-103761 A  | 5/2012  |
| JP | 2013-161129 A  | 8/2013  |
| JP | 2014-10671 A   | 1/2014  |
| JP | 5617811 B2     | 9/2014  |
| WO | 95/27334 A1    | 10/1995 |
| WO | 00/044018 A1   | 7/2000  |
| WO | 2014/050306 A1 | 4/2014  |
| WO | 2014/136455 A1 | 9/2014  |

* cited by examiner

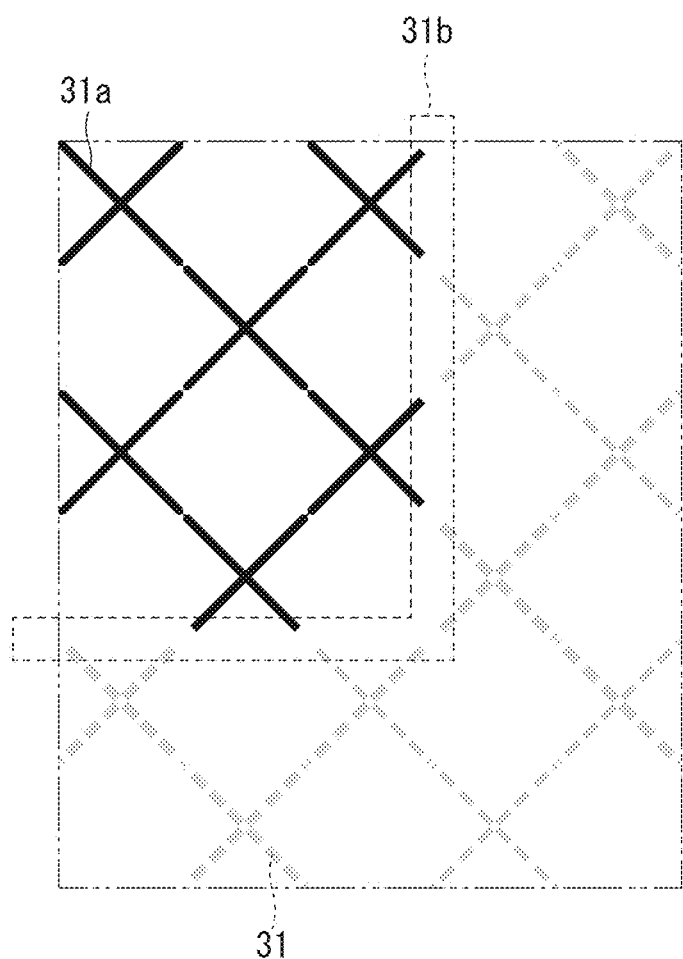
F I G. 6

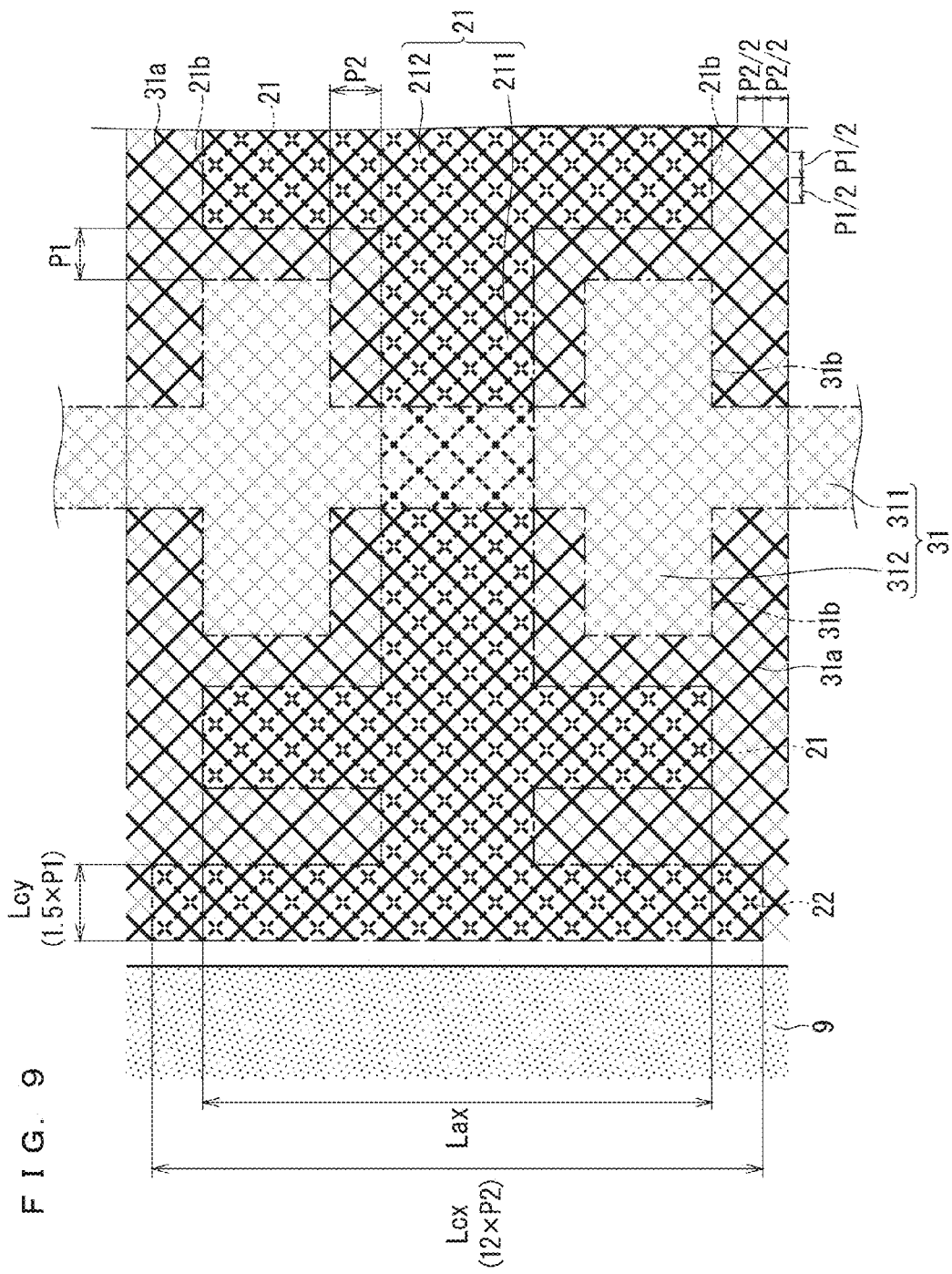
F I G. 9

TOUCH SCREEN, TOUCH PANEL, DISPLAY, AND ELECTRONIC APPARATUS

BACKGROUND OF THE INVENTION

Field of the Invention

The present invention relates to a touch screen, a touch panel including the touch screen, a display including the touch panel, and an electronic apparatus.

Description of the Background Art

A touch panel is a device that detects a touch of an indicator such as a finger and specifies coordinates of a position of the touch on the touch panel, and is attracting attention as one of excellent user interface means. Various types of touch panels such as resistive film touch panels and capacitive touch panels are commercially available now. A touch panel typically includes a touch screen with a built-in touch sensor (sensor for detecting a touch) and a detection device for specifying coordinates of a position of a touch based on a signal input from the touch screen.

A projected capacitive touch panel is an example of the capacitive touch panel (for example, see Japanese Patent Application Laid-Open No. 2012-103761). The projected capacitive touch panel as disclosed in Japanese Patent Application Laid-Open No. 2012-103761 allows detection of a touch even if a front side of a touch screen with a built-in touch sensor is covered with a protective plate such as a glass plate having a thickness of approximately several millimeters. The projected capacitive touch panel has excellent ruggedness since the protective plate can be disposed on the front side of the touch screen. Further, the projected capacitive touch panel can detect a touch even when a user touches it with gloves on. Moreover, the projected capacitive touch panel, which has no movable part, is long-lived because a malfunction due to the movable part does not occur.

The projected capacitive touch panel includes, as detection wiring for detecting capacitance, a first series of conductive elements formed on a thin dielectric film and a second series of conductive elements formed above the first series of conductive elements with an insulating film therebetween, for example. These series of conductive elements form a plurality of intersections without electrically contacting each other.

In a configuration as disclosed in Japanese Unexamined Patent Application Publication (Translation of PCT Application) No. 9-511086 (1997), a detection circuit detects capacitance formed between an indicator such as a finger and the first series of conductive elements and the second series of conductive elements as the detection wiring, to thereby specify coordinates of a position of a touch of the indicator. Such a method for detecting coordinates of a position is commonly referred to as a self-capacitance detection method.

For example, there is a method for detecting a change in electric field, namely, a change in mutual capacitance, between a plurality of row-direction wires that extend in a row direction and form a first electrode and a plurality of column-direction wires that extend in a column direction and form a second electrode to specify coordinates of a position of a touch (for example, see Japanese Unexamined Patent Application Publication (Translation of PCT Application) No. 2003-526831). The detection method is commonly referred to as a mutual capacitance detection method.

Both of the self-capacitance method and the mutual capacitance method described above typically include a method for specifying, when an indicator such as a finger touches a planar area (detection cells) partitioned into a lattice pattern by the row-direction wires and the column-direction wires, coordinates of a position of the touch based on a balance between a detection value in the touched detection cell (sensor block) and a detection value in a detection cell near the sensor block.

The row-direction wires and the column-direction wires typically form sensor capacitors, but it is ideally preferable that the sensor capacitors are manufactured such that capacitance of a pair of sensor capacitors without the action of a physical quantity is equal to that of any sensor capacitors. However, when a touch panel is used in combination with a display module such as a liquid crystal display (LCD), parasitic capacitance is excessively formed between lead-out wiring outside a touch screen and the display module such as the LCD. Thus, even in a state where a physical quantity does not act on the touch screen, an offset occurs in the capacitance of the sensor capacitors.

The offset of the capacitance irrelevant to the action of the physical quantity is hard to distinguish from capacitance occurring due to the action of the physical quantity, which becomes a cause of a detection error in the physical quantity. Thus, a method for reducing the offset of the capacitance of the pair of sensor capacitors has been proposed.

For example, in a touch screen forming a touch panel as disclosed in Japanese Patent No. 5617811, a plurality of lead-out wires surround a periphery of a detection area formed of detection wiring, dummy lead-out wiring is provided along the outside of the outermost lead-out wire, and the dummy lead-out wiring is fixed at a predetermined potential, which allows for a configuration capable of suppressing an offset of capacitance.

However, the configuration as disclosed in Japanese Patent No. 5617811 is capable of suppressing the offset of the capacitance when the dummy lead-out wiring is at a potential close to that of the detection wiring. Thus, when the dummy lead-out wiring is at a potential different from that of the detection wiring, coupling between the dummy lead-out wiring and the detection wiring increases parasite capacitance and the offset of the capacitance of the detection wiring may be conversely increased.

On the other hand, a touch screen includes the dummy lead-out wiring provided at an interval from the detection area to suppress the offset of the capacitance. When the touch screen is mounted on a liquid crystal display that includes a front frame having conductivity and being grounded, coupling between the front frame and the detection wiring increases the offset of the capacitance of the detection wiring.

SUMMARY OF THE INVENTION

It is an object of the present invention to provide a technology capable of reducing an offset of capacitance of a detection cell and reducing unevenness of sensitivity to detection.

A touch screen according to the present invention includes a column-direction wire extending in a column direction and a row-direction wire extending in a row direction orthogonal to the column direction. The column-direction wire and the row-direction wire three-dimensionally intersect each other in a region that is a detection cell. At least one of the column-direction wire and the row-direction wire has an end portion whose width is larger than a width of another portion of the wire, the end portion being a wire-end expansion portion. The wire-end expansion portion is provided so as to be located outside an edge of an outermost column-direction wire and an outermost row-direction wire that are disposed on the outermost side of a detectable area formed of a plurality of the column-direction wires and a plurality of the row-direction wires. The column-direction wire and the row-direction wire each have a mesh structure in which a plurality of conductor wires are disposed in a mesh pattern. The wire-end expansion portion has the mesh structure.

The present invention can suppress coupling between the outermost column-direction wire and the outermost row-direction wire and a front frame, reduce an offset of self-capacitance of the outermost column-direction wire and the outermost row-direction wire, and reduce unevenness of sensitivity to detection in a case where the touch screen is housed in an opening of the frame that has conductivity and is grounded. The row-direction wire and the column-direction wire each have the mesh structure, allowing to cover a wider detectable area with a smaller wiring area and to reduce parasitic capacitance of the wiring. This can also suppress occurrence of moiré fringes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an enlarged view of the upper electrode of the touch screen in the first preferred embodiment according to the present invention;

FIGS. 7 to 9 are plan views of the lower electrode and the upper electrode of the touch screen in the first preferred embodiment according to the present invention;

DESCRIPTION OF THE PREFERRED EMBODIMENTS

<Layer Structure of Touch Screen>

Figure 1:
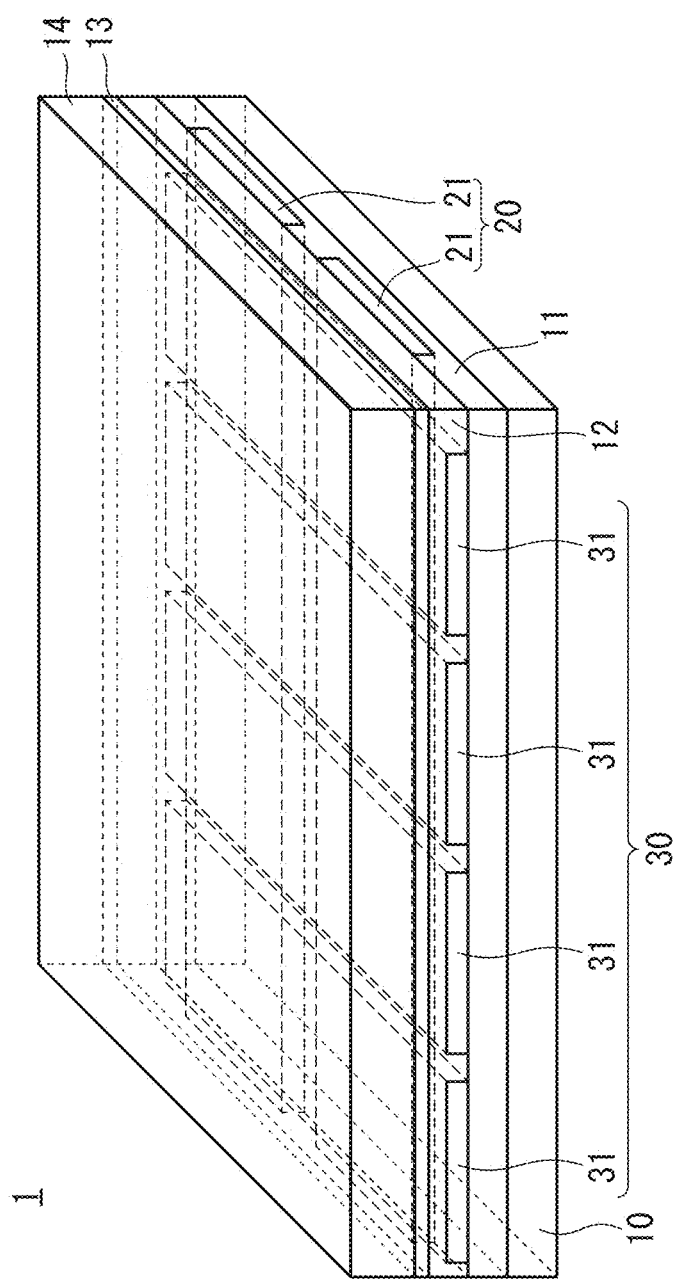
FIG. 1 is a perspective view for describing a layer structure of a touch screen according to the present invention.
Figure 2:
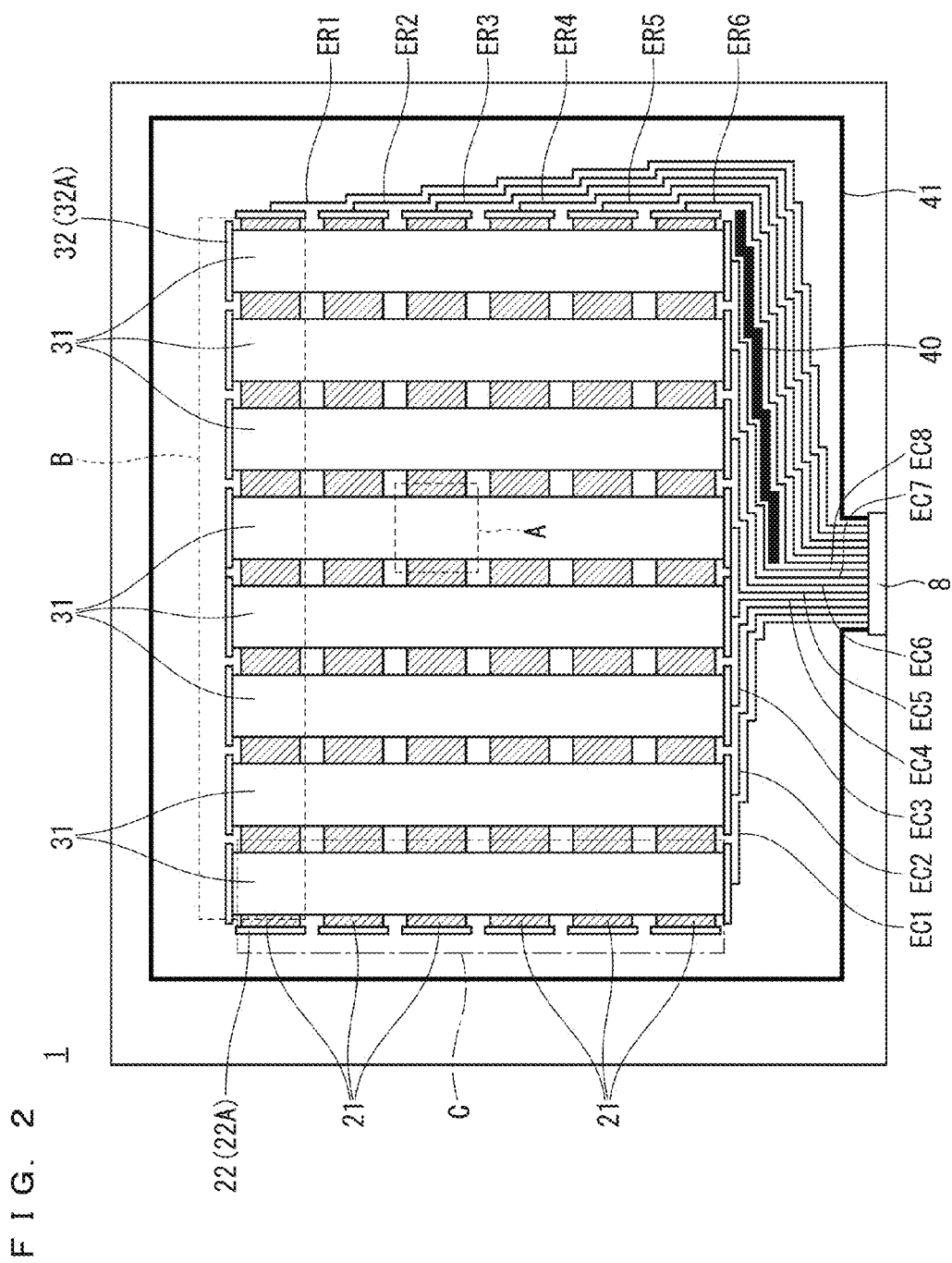
FIG. 2 is a plan view showing a configuration of the touch screen according to the present invention.

First, with reference to FIGS. 1 and 2, a layer structure of a touch screen according to the present invention is described. Hereinafter, a projected capacitive touch screen is described as an example.

FIG. 1 is a perspective view showing a layer structure of a touch screen 1 according to the present invention and shows part cut out of the touch screen 1. A transparent substrate 10 made of a transparent glass material or transparent resin is provided as the lowest layer of the touch screen 1 shown in FIG. 1. A lower electrode 20 is provided above the transparent substrate 10, and an interlayer insulating film 11 is provided so as to cover the lower electrode 20. The interlayer insulating film 11 is made of a transparent insulating film (having translucency) such as a silicon nitride film and a silicon oxide film.

An upper electrode 30 extending in a direction orthogonal to the lower electrode 20 is provided on the interlayer insulating film 11. A protective film 12 is provided so as to cover the upper electrode 30. The protective film 12 is made of a transparent insulating film such as a silicon nitride film and a silicon oxide film similarly to the interlayer insulating film 11.

A polarizing plate 13 for a liquid crystal display (LCD) on which the touch screen 1 is mounted is provided on (bonded to) the protective film 12. A transparent substrate 14 made of a transparent material or transparent resin is provided on (bonded to) the polarizing plate 13 to protect the touch screen 1.

The lower electrode 20 includes a plurality of row-direction wires 21 made of a transparent wiring material such as indium tin oxide (ITO) or a metal wiring material such as aluminum and copper. The upper electrode 30 includes a plurality of column-direction wires 31 made of a transparent wiring material such as ITO or a metal wiring material such as aluminum and copper similarly to the row-direction wires 21.

The column-direction wires 31 and the row-direction wires 21 each have a multilayer structure including an aluminum-based alloy layer and a nitrided aluminum-based alloy layer. Such a structure can reduce wiring resistance and light reflectance in a detectable area. Herein, the detectable area refers to an area, of the touch screen 1, in which a touch of an indicator such as a finger can be detected.

FIG. 1 shows the configuration in which the column-direction wires 31 are disposed in a layer above the row-direction wires 21, but the positional relationship may be reversed so that the row-direction wires 21 may be disposed in a layer above the column-direction wires 31.

It is described that the materials for the column-direction wires 31 and the row-direction wires 21 are the aluminum-based alloy layer and the nitrided aluminum-based alloy layer in the multilayer structure, but the structure is not limited to this structure. For example, the materials for the column-direction wires 31 are the aluminum-based alloy layer and the nitrided aluminum-based alloy layer in the multilayer structure, and the row-direction wires 21 may be made of a transparent wiring material such as ITO.

The column-direction wires 31 and the row-direction wires 21 may be disposed in the same layer, and the interlayer insulating film 11 may be provided only in portions where the column-direction wires 31 and the row-direction wires 21 overlap (intersect) each other in plan view to electrically separate the column-direction wires 31 and the row-direction wires 21 from each other.

A user touches the transparent substrate 14 being a surface of the touch screen 1 with an indicator such as a finger to perform operation. When the indicator comes into contact with (touches) the transparent substrate 14, capacitive coupling (touch capacitance) occurs between the indicator and the column-direction wires 31 and the row-direction wires 21. In a case where the touch screen 1 is a mutual capacitive touch screen, the occurrence of the touch capacitance allows detection of a change in the mutual capacitance caused between the upper electrode and the lower electrode to specify a position of the touch in the detectable area.

FIG. 2 is a plan view showing an example of a configuration of the touch screen 1. The detectable area in the touch screen 1 is a matrix region formed of the plurality of row-direction wires 21 extending in the row direction (horizontal direction of the paper plane) and the plurality of column-direction wires 31 extending in the column direction (vertical direction of the paper plane) in front of the row-direction wires 21.

The row-direction wires 21 are each connected, through lead-out wires ER1 to ER6, to a terminal 8 for electrically connecting the row-direction wires 21 to external wiring. The column-direction wires 31 are each connected to the terminal 8 through lead-out wires EC1 to EC8.

The lead-out wires ER1 to ER6 and the lead-out wires EC1 to EC8 are disposed close to one another in the periphery of the detectable area. Of the lead-out wires ER1 to ER6, the lead-out wire ER6 having the shortest length is disposed on the innermost side, and the lead-out wire ER1 having the longest length is disposed on the outermost side. The other lead-out wires ER2 to ER5 are disposed between the lead-out wire ER6 and the lead-out wire ER1. Of the lead-out wires EC1 to EC8, the lead-out wire EC1 to the lead-out wire EC4, which is positioned as a reference, and the lead-out wire EC5, which is positioned as a reference, to the lead-out wire EC8 extend in the row direction and are disposed close to one another in the periphery of the detectable area. The lead-out wire EC4 is connected to a column-direction wire 31 located closest to the terminal 8. The lead-out wire EC1 is connected to a column-direction wire 31 located farthest from the terminal 8. The lead-out wire EC5 is connected to a column-direction wire 31 located closest to the terminal 8. The lead-out wire EC8 is connected to a column-direction wire 31 located farthest from the terminal 8.

The lead-out wires ER1 to ER6 and the lead-out wires EC1 to EC8 are disposed close to one another in the periphery of the detectable area in this manner, so that fringe capacitance occurring between the display on which the touch screen 1 is mounted and lead-out wires E (lead-out wires ER2 to ER6, lead-out wires EC2 to EC8) except for the outermost lead-out wires ER1 and EC1 can be suppressed.

A shield wire 40 to which reference potential such as ground potential is given is provided in a portion between the lead-out wire EC8 of the column-direction wire 31 and the lead-out wire ER6 of the row-direction wire 21 that extend parallel to each other.

Providing the shield wire 40 in this manner can greatly reduce cross capacitance between the lead-out wire EC8 and the lead-out wire ER6, so that a detection error can be prevented even when an indicator such as a finger touches this portion.

Furthermore, an outermost shield wire 41 receiving an input of ground potential is disposed outside the outermost lead-out wires ER1 and EC1 and the detectable area.

Providing the outermost shield wire 41 in this manner can absorb the entry of electromagnetic noise from the outside, so that degradation in detecting performance due to the electromagnetic noise can be prevented.

In addition, the row-direction wires 21 and the column-direction wires 31 each have a mesh structure in which a plurality of conductor wires are disposed in a mesh pattern, but this is not shown in FIGS. 1 and 2 for the sake of simplification. The most distinctive characteristic of the present invention is the mesh structure, and thus the mesh structures of the row-direction wires 21 and the column-direction wires 31 are described below in a first preferred embodiment and a second preferred embodiment according to the present invention.

First Preferred Embodiment

With reference to FIGS. 3 to 9, structures of the row-direction wires 21 and the column-direction wires 31 in the touch screen 1 in the first preferred embodiment according to the present invention are described. In FIGS. 3 to 9, the horizontal direction of the paper plane is a row direction and the vertical direction of the paper plane is a column direction. FIGS. 3 to 9 schematically show the structures of the row-direction wires 21 and the column-direction wires 31, and the wires have a thickness and an arrangement interval between the wires different from the actual dimensions.

<Structure of Wiring>

Figure 3:
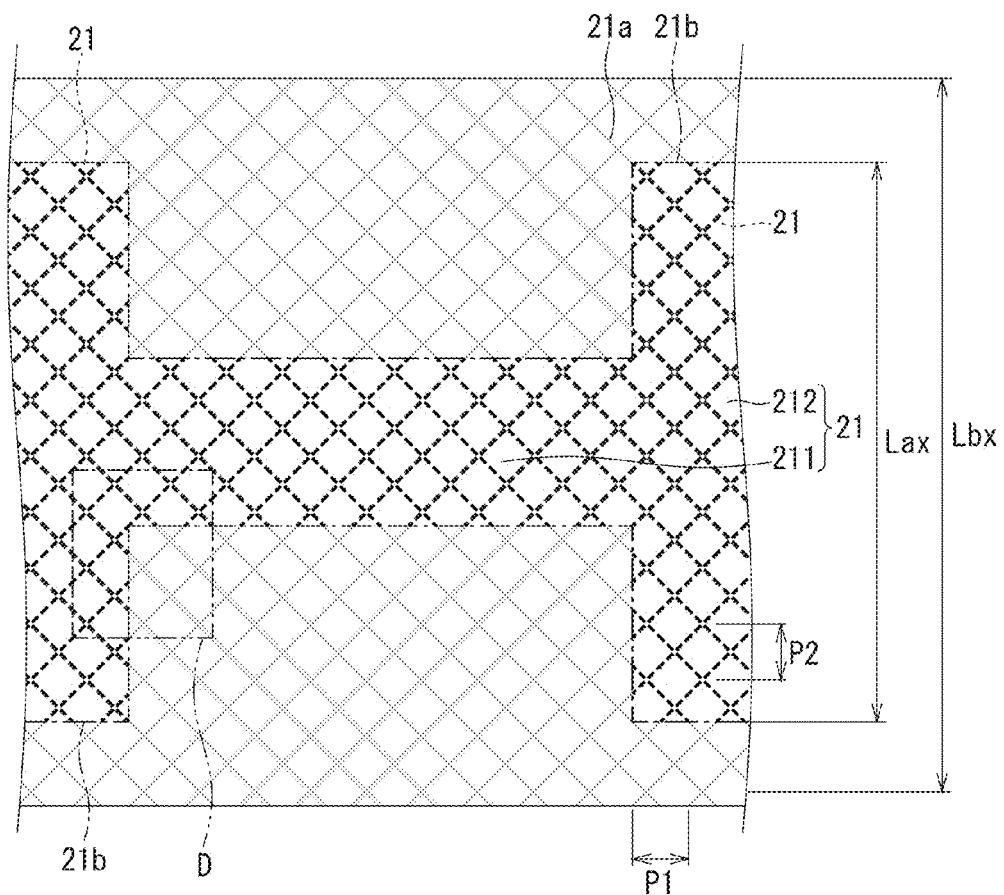
FIG. 3 is a plan view of a lower electrode of the touch screen in a first preferred embodiment according to the present invention.

FIG. 3 is an enlarged plan view of the lower electrode 20 in a region A indicated by a broken line in FIG. 2 in which the row-direction wire 21 and the column-direction wire 31 overlap each other in plan view. The region A corresponds to a detection cell.

As shown in FIG. 3, the lower electrode 20 has a mesh structure in which first row-direction conductor wires and second row-direction conductor wires repeatedly intersect each other. The first row-direction conductor wires extend in a first direction at an angle of 45° with respect to the row direction, and the second row-direction conductor wires extend in a second direction opposite to the first direction at an angle of 45° with respect to the row direction. A repeated interval of the mesh in the row direction and a repeated interval of the mesh in the column direction, which are respectively P1 and P2, are set to be the same.

The lower electrode 20 has the mesh structure as described above. To be accurate, the mesh is not consecutive, and includes a mesh forming the row-direction wires 21 and a mesh forming a floating electrode 21a that surrounds the row-direction wires 21. In other words, the row-direction wire 21 has a row-direction middle line 211 extending in the row direction and a plurality of row-direction-wire expansion portions 212 that are provided at predetermined intervals in a direction in which the row-direction middle line 211 extends and that are formed by partially expanding the width of the row-direction middle line 211 in the column direction. The row-direction-wire expansion portion 212 has a width Lax set to be smaller than a length Lbx in the column direction of a unit cell (detection cell) defined by the region A in which the row-direction wire 21 and the column-direction wire 31 overlap each other in plan view.

This indicates that the row-direction wire 21 has a maximum width set to be smaller than an interval between the row-direction wires 21 repeatedly disposed in the detectable area. This setting can prevent the row-direction wires 21 adjacent to each other from interfering each other.

As described above, the floating electrode 21a is provided so as to surround the row-direction wire 21 that has the row-direction middle line 211 extending in the row direction and the plurality of row-direction-wire expansion portions 212 provided in the direction in which the row-direction middle line 211 extends. The floating electrode 21a is electrically insulated from the row-direction wire 21 by a disconnection portion 21b provided along the outline of the row-direction wire 21. The floating electrode 21a is not grounded and has a potential in a floating state.

Figure 4:
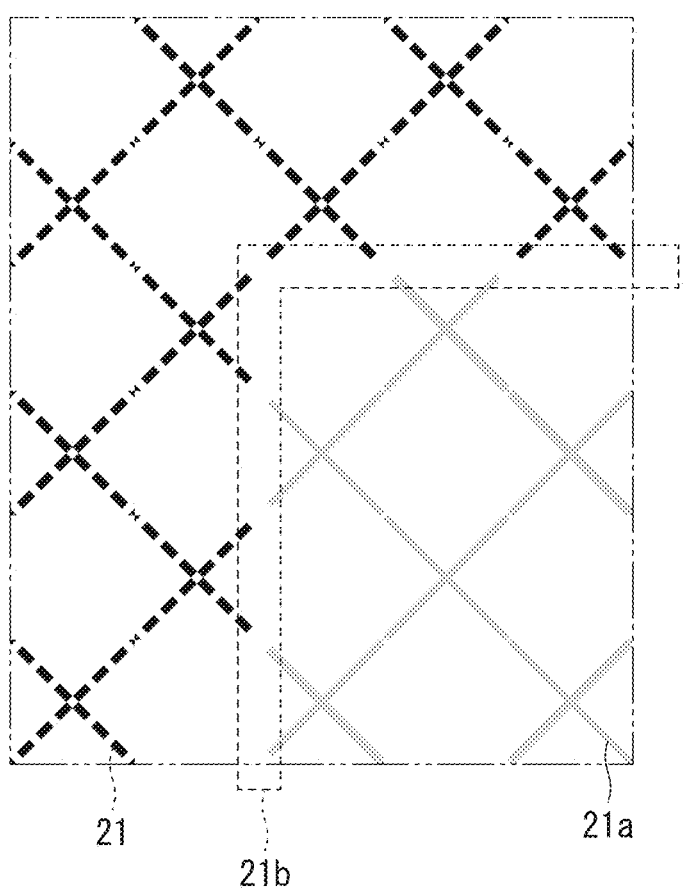
FIG. 4 is an enlarged view of the lower electrode of the touch screen in the first preferred embodiment according to the present invention.

FIG. 4 shows an enlarged view of a region D in FIG. 3. The region D corresponds to a corner portion of a connection between the row-direction middle line 211 and the row-direction-wire expansion portion 212. The connection between the mesh forming the row-direction wire 21 and the mesh forming the floating electrode 21a is broken. The broken portion is the disconnection portion 21b that defines the outline of the row-direction wire 21. The row-direction wire 21 is surrounded by the floating electrode 21a and is thus electrically insulated from the adjacent row-direction wire 21.

This configuration can suppress coupling between the row-direction wires 21 adjacent to each other, so that a delay and cross talk of detection signals when the touch screen 1 is connected to the detection circuit can be suppressed.

Providing the floating electrode 21a causes the row-direction wires 21 to be buried as part of the mesh pattern, thereby preventing only the row-direction wires 21 from being visually identified.

Figure 5:
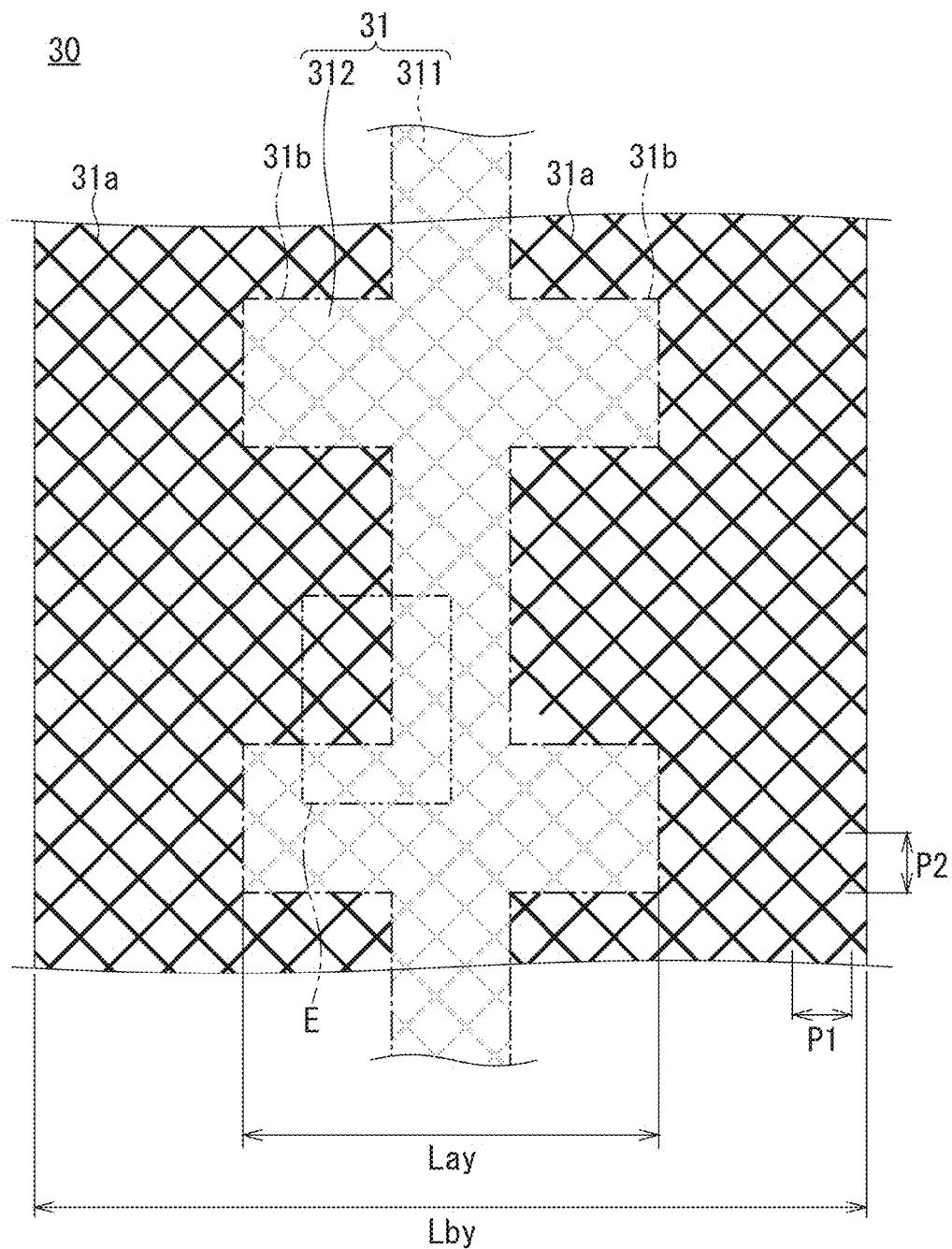
FIG. 5 is a plan view of an upper electrode of the touch screen in the first preferred embodiment according to the present invention.

FIG. 5 is an enlarged plan view of the upper electrode 30 in the region A indicated by the broken line in FIG. 2 in which the row-direction wire 21 and the column-direction wire 31 overlap each other in plan view.

As shown in FIG. 5, the upper electrode 30 has a mesh structure in which first column-direction conductor wires and second column-direction conductor wires repeatedly intersect each other. The first column-direction conductor wires extend in a first direction at an angle of 45° with respect to the row direction, and the second column-direction conductor wires extend in a second direction opposite to the first direction at an angle of 45° with respect to the row direction. A repeated interval of the mesh in the row direction and a repeated interval of the mesh in the column direction, which are respectively P1 and P2, are set to be the same.

The upper electrode 30 has the mesh structure as described above. To be accurate, the mesh is not consecutive, and includes a mesh forming the column-direction wires 31 and a mesh forming a floating electrode 31a that surrounds the column-direction wires 31. In other words, the column-direction wire 31 has a column-direction middle line 311 extending in the column direction and a plurality of column-direction-wire expansion portions 312 that are provided at predetermined intervals in a direction in which the column-direction middle line 311 extends and that are formed by partially expanding the width of the column-direction middle line 311 in the row direction. The column-direction-wire expansion portion 312 has a width Lay set to be smaller than a length Lby in the row direction of the unit cell (detection cell) defined by the region A in which the row-direction wire 21 and the column-direction wire 31 overlap each other in plan view.

This indicates that the column-direction wire 31 has a maximum width set to be smaller than an interval between the column-direction wires 31 repeatedly disposed in the detectable area. This setting can prevent the column-direction wires 31 adjacent to each other from interfering each other.

As described above, the floating electrode 31a is provided so as to surround the column-direction wire 31 that has the column-direction middle line 311 extending in the column direction and the plurality of column-direction-wire expansion portions 312 provided in the direction in which the column-direction middle line 311 extends. The floating electrode 31a is electrically insulated from the column-direction wire 31 by a disconnection portion 31b provided along the outline of the column-direction wire 31. The floating electrode 31a is not grounded and has a potential in a floating state.

FIG. 6 shows an enlarged view of a region E in FIG. 5. The region E corresponds to a corner portion of a connection between the column-direction middle line 311 and the column-direction-wire expansion portion 312. The connection between the mesh forming the column-direction wire 31 and the mesh forming the floating electrode 31a is broken. The broken portion is the disconnection portion 31b that defines the outline of the column-direction wire 31. The column-direction wire 31 is surrounded by the floating electrode 31a and is thus electrically insulated from the adjacent column-direction wire 31.

This configuration can suppress coupling between the column-direction wires 31 adjacent to each other, so that a delay and cross talk of detection signals when the touch screen 1 is connected to the detection circuit can be suppressed.

Providing the floating electrode 31a causes the column-direction wires 31 to be buried as part of the mesh pattern, thereby preventing only the column-direction wires 31 from being visually identified.

Figure 7:
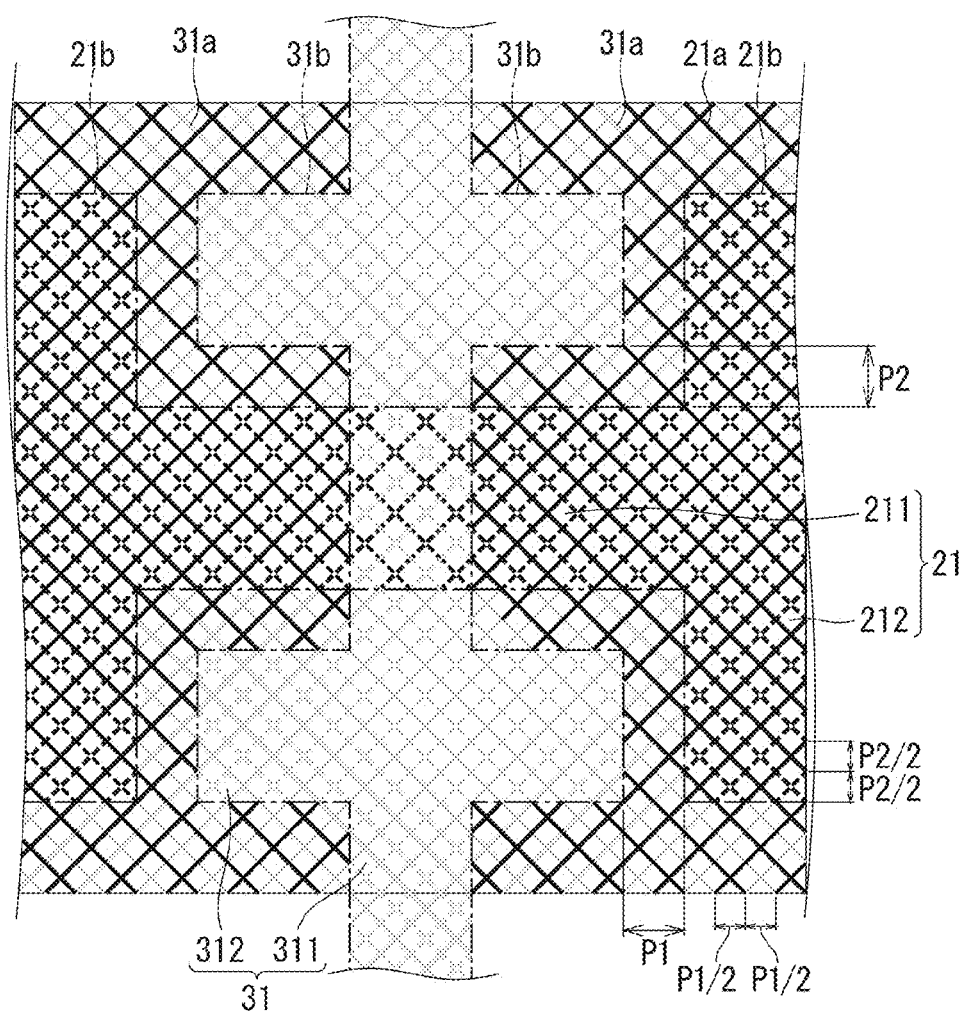

FIG. 7 is an enlarged plan view of the lower electrode 20 and the upper electrode 30 in the region A indicated by the broken line in FIG. 2 in which the row-direction wire 21 and the column-direction wire 31 overlap each other in plan view.

As shown in FIG. 7, the row-direction wire 21 and the column-direction wire 31 are disposed such that the mesh structures thereof are complementarily displaced and overlap each other in plan view. Thus, the region in which the row-direction wire 21 and the column-direction wire 31 overlap each other in plan view has a mesh interval that is half a mesh interval of the other regions.

In other words, while FIG. 3 shows that the lower electrode 20 has the repeated interval of the mesh in the row direction and the repeated interval of the mesh in the column direction, which are respectively P1 and P2, disposing this lower electrode 20 above the upper electrode 30 such that the meshes are each displaced by half of P1 and P2, which are P1/2 and P2/2, allows the mesh interval of the region in which the lower electrode 20 and the upper electrode 30 overlap each other in plan view to be visually identified as half the mesh interval of the other region.

For example, each mesh of the row-direction middle line 211 and the column-direction middle line 311 is complementarily displaced and each mesh interval is reduced by half in the region in which the row-direction middle line 211 and the column-direction middle line 311 overlap each other in plan view. For example, each mesh of the row-direction middle line 211 and the floating electrode 31a is complementarily displaced and each mesh interval is reduced by half in the region in which the row-direction middle line 211 and the floating electrode 31a overlap each other in plan view. For example, each mesh of the column-direction middle line 311 and the floating electrode 21*a* is complementarily displaced and each mesh interval is reduced by half in the region in which the column-direction middle line 311 and the floating electrode 21*a* overlap each other in plan view.

As described above, the mesh interval in the region (corresponding to the unit cell) in which the row-direction wire 21 and the column-direction wire 31 overlap each other in plan view is reduced to half a mesh interval of the other wiring portion. This makes external-light reflectance of a portion of intersection of the row-direction wire 21 and the column-direction wire 31 uniform, which can prevent the row-direction wire 21 and the column-direction wire 31 from being visually identified.

Figure 8:
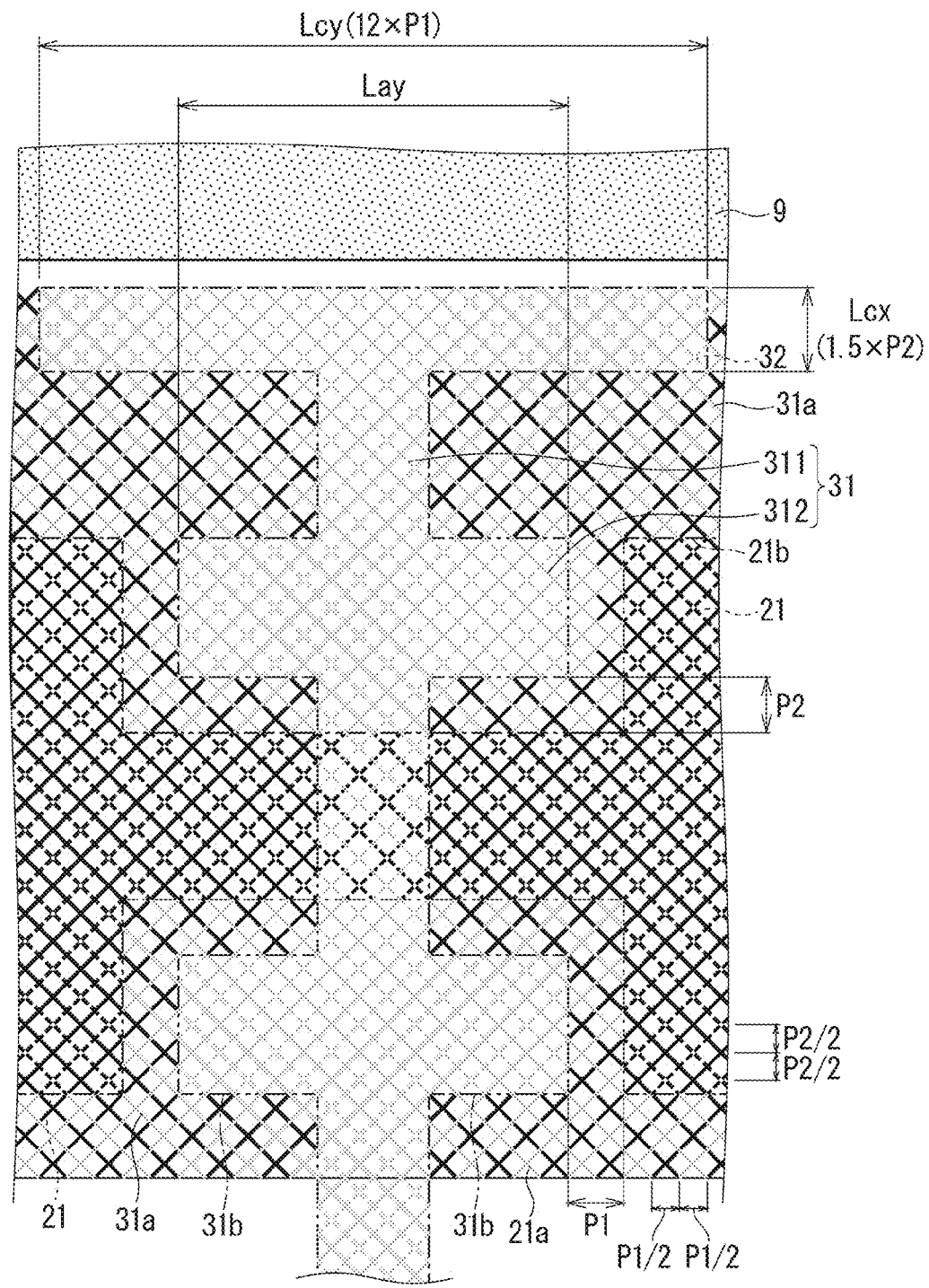

FIG. 8 is an enlarged plan view of the lower electrode 20 and the upper electrode 30 in an edge region of the column-direction wire 31, which is a region B indicated by a broken line in FIG. 2.

FIG. 8 shows a wire-end expansion portion 32 provided so as to face an inner edge of an opening in a front frame 9 on which the touch screen 1 is mounted, in addition to the unit cell in which the row-direction wire 21 and the column-direction wire 31 overlap each other in plan view as shown in FIG. 7. The front frame 9 is omitted from FIG. 2 for the sake of convenience.

The wire-end expansion portion 32 is formed by partially expanding the width of the column-direction middle line 311 in the row direction at the end portion of the column-direction middle line 311 of the column-direction wire 31. The wire-end expansion portion 32 is electrically connected to the column-direction wire 31.

The wire-end expansion portion 32 has a width Lcy in the row direction set to be larger than the width Lay of the column-direction-wire expansion portion 312. The dimension of the width Lcy is twelve times as large as the repeated interval P1 in the row direction of the mesh (12×P1). A width Lcx in the column direction of the wire-end expansion portion 32 is 1.5 times as large as the repeated interval P2 in the column direction of the mesh (1.5×P2).

Providing the wire-end expansion portion 32 can suppress coupling between the row-direction wire 21 and the front frame 9, which can reduce an offset of capacitance of the row-direction wire 21 located on the outermost side of the detectable area. In other words, the wire-end expansion portion 32 absorbs an electric field occurring between the row-direction wire 21 located on the outermost side of the detectable area and the front frame 9, and a shielding effect is improved by the wire-end expansion portion 32, so that the offset of the capacitance of the row-direction wire 21 can be reduced.

The wire-end expansion portion 32 has the same mesh structure as that of the column-direction wire 31 and the floating electrode 31*a*. The wire-end expansion portion 32 is surrounded by the floating electrode 31*a*.

As described above, the wire-end expansion portion 32 has the same mesh structure as that of the column-direction wire 31 and is surrounded by the floating electrode 31*a*, so that the wire-end expansion portion 32 can be prevented from being visually identified near the inner edge of the opening in the front frame 9.

FIG. 9 is an enlarged plan view of the lower electrode 20 and the upper electrode 30 in an edge region of the row-direction wire 21, which is a region C indicated by a broken line in FIG. 2.

FIG. 9 shows a wire-end expansion portion 22 provided so as to face an inner edge of the opening in the front frame 9 on which the touch screen 1 is mounted, in addition to the unit cell in which the row-direction wire 21 and the column-direction wire 31 overlap each other in plan view as shown in FIG. 6.

The wire-end expansion portion 22 is formed by partially expanding the width of the row-direction middle line 211 in the column direction at the end portion of the row-direction middle line 211 of the row-direction wire 21. The wire-end expansion portion 22 is electrically connected to the row-direction wire 21.

The wire-end expansion portion 22 has a width Lcx in the column direction set to be larger than the width Lax of the row-direction-wire expansion portion 212. The dimension of the width Lcx is twelve times as large as the repeated interval P2 in the column direction of the mesh (12×P2). A width Lcy in the row direction of the wire-end expansion portion 22 is 1.5 times as large as the repeated interval P1 in the row direction of the mesh (1.5×P1).

Providing the wire-end expansion portion 22 can suppress coupling between the column-direction wire 31 and the front frame 9, which can reduce an offset of capacitance of the column-direction wire 31 located on the outermost side of the detectable area. In other words, the wire-end expansion portion 22 absorbs an electric field occurring between the column-direction wire 31 located on the outermost side of the detectable area and the front frame 9, and a shielding effect is improved by the wire-end expansion portion 22, so that the offset of the capacitance of the column-direction wire 31 can be reduced.

The wire-end expansion portion 22 has the same mesh structure as that of the row-direction wire 21 and the floating electrode 21*a*. The wire-end expansion portion 22 is surrounded by the floating electrode 21*a*.

The wire-end expansion portion 22 has the same mesh structure as that of the row-direction wire 21 and is surrounded by the floating electrode 21*a*, so that the wire-end expansion portion 22 can be prevented from being visually identified near the inner edge of the opening in the front frame 9.

In the first preferred embodiment described above, the conductor wires, which form the meshes of the row-direction wires 21 and the column-direction wires 31, each have a width of 3 µm, and the disconnection portions each have a disconnection interval of 10 µm. Also in this preferred embodiment, the transparent substrate 10 has a thickness of 0.7 mm, and the interval P1 in the row direction of the mesh and the interval P2 in the column direction of the mesh are each 200 µm.

This preferred embodiment shows the configuration including both of the wire-end expansion portion 22 and the wire-end expansion portion 32, but a configuration may include only one of them. Priority is preferably given to disposing such a wire-end expansion portion that shields an electric field occurring between wiring extending in the direction of the length of the touch screen 1 in plan view and the inner edge of the opening in the front frame 9. This corresponds to a configuration including only the wire-end expansion portion 32 in the case of this preferred embodiment. Accordingly, priority can be given to protecting wiring in which an offset of capacitance is most likely to occur.

The row-direction wire 21 and the column-direction wire 31 each have the mesh structure, allowing to cover a wider detectable area with a smaller wiring area and to reduce parasitic capacitance of the wiring. This can also suppress occurrence of moiré fringes.

In this preferred embodiment, the wiring has the mesh structure in which the conductor wires extending in the first direction at the angle of 45° with respect to the row direction and the conductor wires extending in the second direction opposite to the first direction at the angle of 45° with respect to the row direction are repeatedly disposed. A mesh structure may be formed of curved lines such as circular arcs, for example. This case still does not lose the effects of this preferred embodiment.

Transparent conductive materials such as ITO and graphene or metal materials such as aluminum, chromium, copper, and silver may be used as materials for the row-direction wires 21 and the column-direction wires 31. The row-direction wires 21 and the column-direction wires 31 may be made of an alloy of aluminum, chromium, copper, silver, and the like, or may have a multilayer structure in which aluminum nitride is formed on the alloy.

The wire-end expansion portions 22 and 32 may be made of the same material as that for the row-direction wires 21 and the column-direction wires 31, and using the same material can simplify the manufacturing steps.

The conductor wire width and the mesh interval may have different values from those in this preferred embodiment according to the use of the touch screen.

<Effects>

Next, the effects of reducing an offset of self-capacitance of the wiring by providing the wire-end expansion portion 22 and the wire-end expansion portion 32 are described. To confirm the effects, a sample of a liquid crystal display on which a touch screen including 10 row-direction wires R1 to R10 and 14 column-direction wires C1 to C14 is mounted is manufactured, the liquid crystal display including a front frame that has conductivity and is grounded. Then, self-capacitance of each wire of the touch screen is measured.

A sample of a liquid crystal display including a touch screen that does not include the wire-end expansion portion 22 and the wire-end expansion portion 32 is similarly manufactured for comparison purpose.

Figure 10:
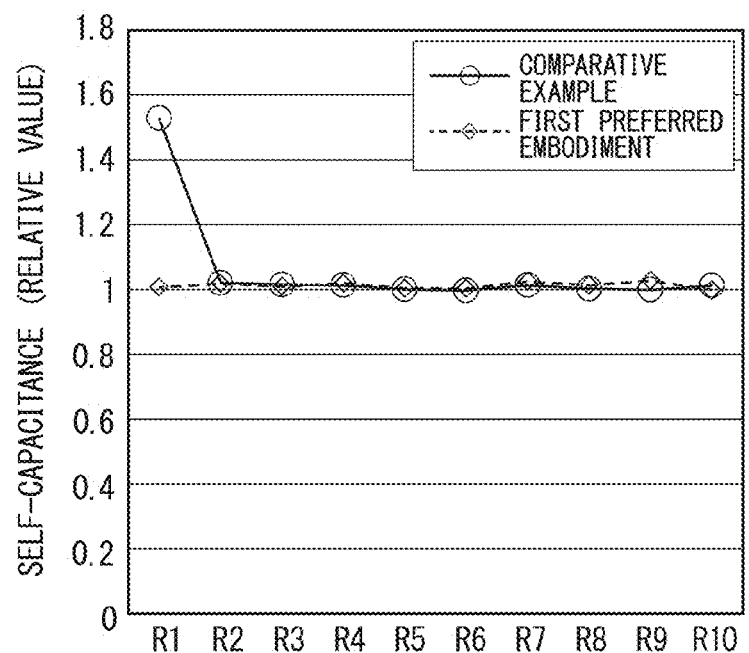
FIG. 10 is a diagram showing self-capacitance of row-direction wiring of the touch screen in the first preferred embodiment according to the present invention.

FIG. 10 shows relative values of self-capacitance of the row-direction wires R1 to R10 of the touch screen in each of a comparative example and this preferred embodiment. The relative value of self-capacitance represents a relative value in a case where self-capacitance of the row-direction wire R5 of the touch screen in the comparative example is set to be 1.

As shown in FIG. 10, in the comparative example, the row-direction wires R2 to R10 have almost equal relative values of self-capacitance of approximately 1, but the row-direction wire R1 located on the outermost side has a relative value of self-capacitance of approximately 1.5, which is offset. On the other hand, in the touch screen in this preferred embodiment, it is clear that all of the row-direction wires including the row-direction wire R1 located on the outermost side have almost equal relative values of self-capacitance of approximately 1.

Figure 11:
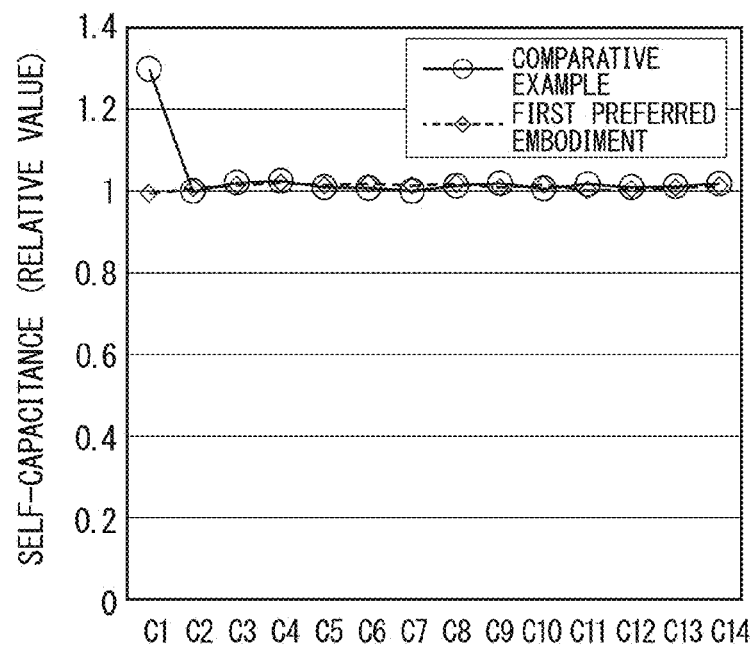
FIG. 11 is a diagram showing self-capacitance of column-direction wiring of the touch screen in the first preferred embodiment according to the present invention.

FIG. 11 shows relative values of self-capacitance of the column-direction wires C1 to C14 of the touch screen in each of the comparative example and this preferred embodiment. The relative value of self-capacitance represents a relative value in a case where self-capacitance of the column-direction wire C7 of the touch screen in the comparative example is set to be 1.

As shown in FIG. 11, in the comparative example, the column-direction wires C2 to C14 have almost equal relative values of self-capacitance of approximately 1, but the column-direction wire C1 located on the outermost side has a relative value of self-capacitance of approximately 1.3, which is offset. On the other hand, in the touch screen in this preferred embodiment, all of the column-direction wires including the column-direction wire C1 located on the outermost side have almost equal relative values of self-capacitance of approximately 1.

As described above, providing the wire-end expansion portion 22 and the wire-end expansion portion 32 suppresses coupling between the outermost column-direction wire 31 and row-direction wire 21 and the front frame 9, which can reduce the offsets of the self-capacitance of the column-direction wire 31 located on the outermost side (outermost column-direction wire) and the row-direction wire 21 located on the outermost side (outermost row-direction wire).

Second Preferred Embodiment

Figure 12:
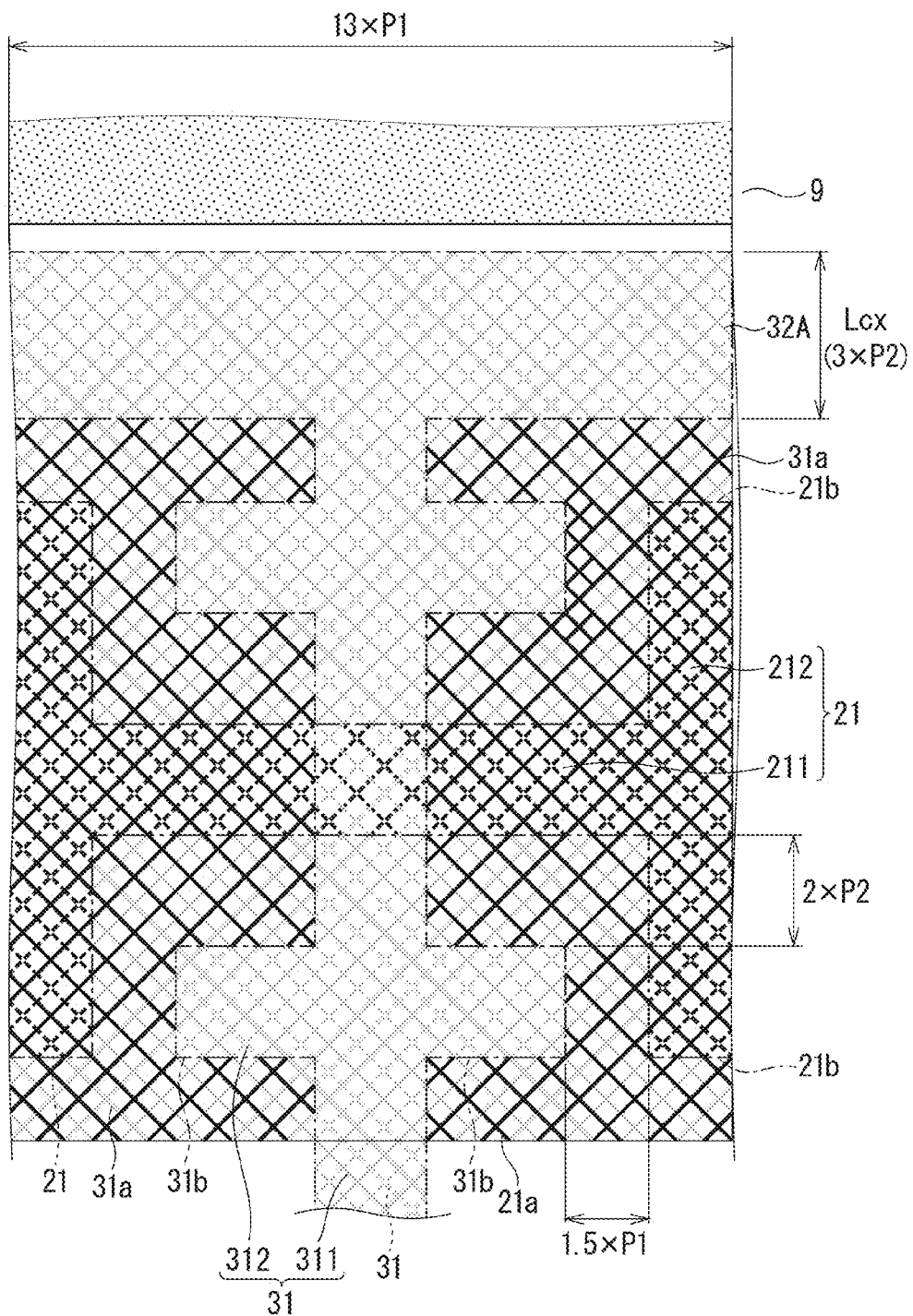
FIGS. 12 and 13 are plan views of a lower electrode and an upper electrode of a touch screen in a second preferred embodiment according to the present invention.
Figure 13:
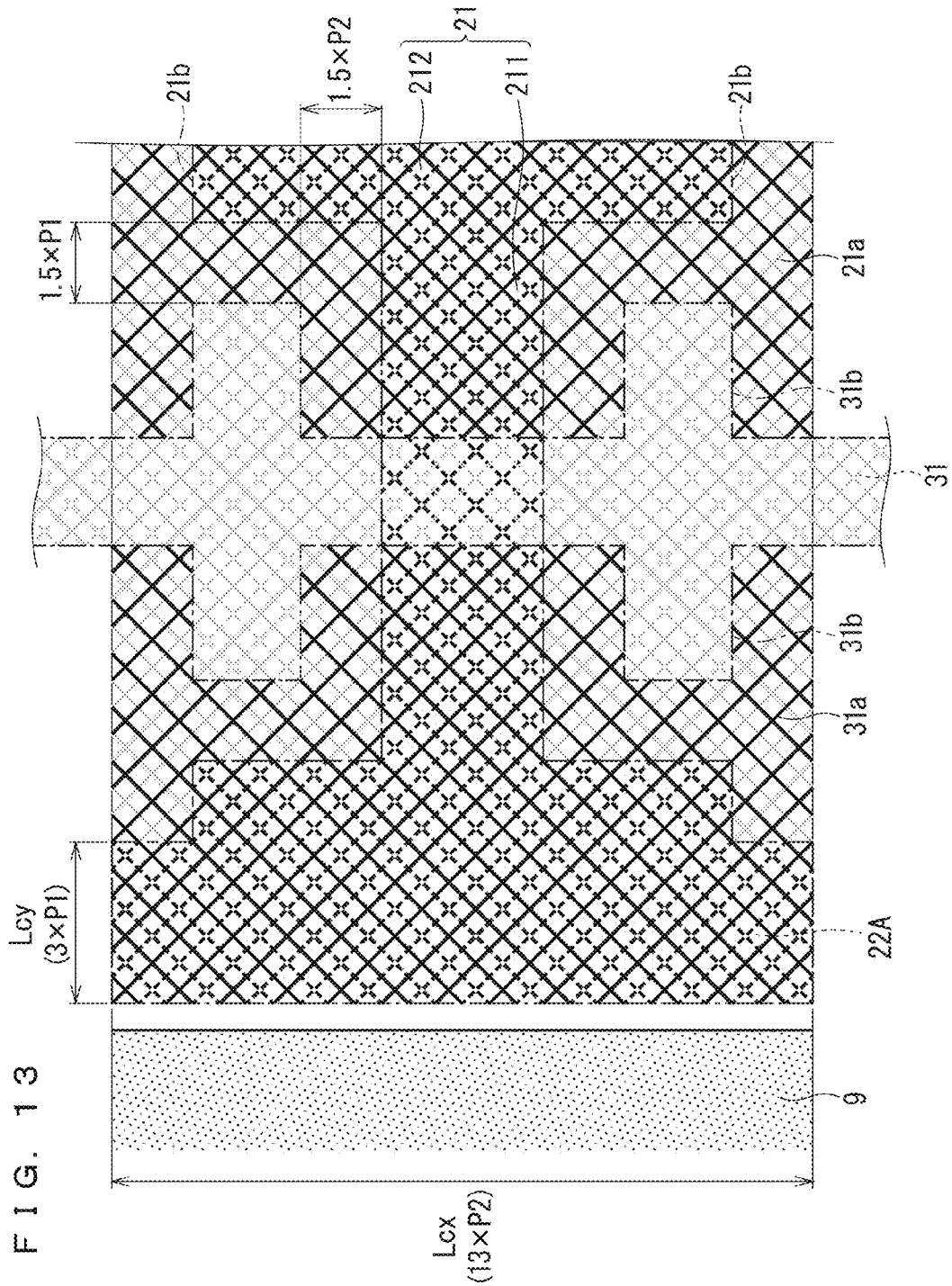

Next, with reference to FIGS. 12 and 13, structures of row-direction wires 21 and column-direction wires 31 in a touch screen 1 in a second preferred embodiment according to the present invention are described. In FIGS. 12 and 13, the horizontal direction of the paper plane is a row direction, and the vertical direction of the paper plane is a column direction. FIGS. 12 and 13 schematically show the structures of the row-direction wires 21 and the column-direction wires 31, and the wires have a thickness and an arrangement interval between the wires different from the actual dimensions.

<Structure of Wiring>

FIG. 12 is an enlarged plan view of a lower electrode 20 and an upper electrode 30 in an edge region of the column-direction wire 31, which is the region B indicated by the broken line in FIG. 2.

FIG. 12 shows a wire-end expansion portion 32A provided so as to face an inner edge of an opening in a front frame 9 on which the touch screen 1 is mounted, in addition to a unit cell in which the row-direction wire 21 and the column-direction wire 31 overlap each other in plan view.

In the configuration of the column-direction wire 31 in the edge region thereof in the touch screen 1 of the second preferred embodiment shown in FIG. 12, the wire-end expansion portion 32A has a width Lcy in the row direction and a width Lcx in the column direction larger than those of the column-direction wire 31 in the region except for the edge region, which is the region (FIG. 8) shown as the region B in FIG. 2. Moreover, in the edge region of the column-direction wire 31 in the touch screen 1 of the second preferred embodiment, the row-direction wire 21 and the column-direction wire 31 have an interval therebetween in plan view greater than that in the region B in FIG. 8.

In other words, the wire-end expansion portion 32A has the width Lcy in the row direction of 13×P1, which is larger than 12×P1 shown in FIG. 8. Further, the wire-end expansion portion 32A has the width Lcx in the column direction of 3×P2, which is larger than 1.5×P2 shown in FIG. 8.

An interval between a row-direction middle line 211 of the row-direction wire 21 and a column-direction-wire expansion portion 312 of the column-direction wire 31 in plan view is expanded from P2 in FIG. 8 to 2×P2. An interval between the column-direction-wire expansion portion 312 of the column-direction wire 31 and a row-direction-wire expansion portion 212 of the row-direction wire 21 in plan view is expanded from P1 in FIG. 8 to 1.5×P1.

Such expansion of the wire-end expansion portion 32A causes an increase in coupling between the row-direction wire 21 and the wire-end expansion portion 32A, and thus an offset of mutual capacitance between the wire-end expansion portion 32A and the row-direction wire 21 easily occurs. However, the adjustment by expanding the interval between the row-direction wire 21 and the column-direction wire 31 in plan view as described above can reduce the offset of the mutual capacitance. An offset of self-capacitance of the row-direction wire 21 due to the wire-end expansion portion 32A can be reduced more than that in the first preferred embodiment, depending on the adjustment.

FIG. 13 is an enlarged plan view of the lower electrode 20 and the upper electrode 30 in an edge region of the row-direction wire 21, which is the region C in FIG. 2 indicated by the broken line.

FIG. 13 shows a wire-end expansion portion 22A provided so as to face an inner edge of the opening in the front frame 9 on which the touch screen 1 is mounted, in addition to the unit cell in which the row-direction wire 21 and the column-direction wire 31 overlap each other in plan view.

The configuration of the row-direction wire 21 in the edge region thereof in the touch screen 1 of the second preferred embodiment shown in FIG. 12, the wire-end expansion portion 22A has a width Lcx in the column direction and a width Lcy in the row direction larger than those of the row-direction wire 21 in the region except for the edge region, which is the region (FIG. 9) shown as the region C in FIG. 2. Moreover, in the edge region of the row-direction wire 21 in the touch screen 1 of the second preferred embodiment, the row-direction wire 21 and the column-direction wire 31 have an interval therebetween in plan view greater than that in the region C in FIG. 9.

In other words, the wire-end expansion portion 22A has the width Lcx in the column direction of 13×P2, which is larger than 12×P2 shown in FIG. 9. Further, the wire-end expansion portion 22A has the width Lcy in the row direction of 3×P1, which is larger than 1.5×P1 shown in FIG. 9.

An interval between the row-direction middle line 211 of the row-direction wire 21 and the column-direction-wire expansion portion 312 of the column-direction wire 31 in plan view is expanded from P2 in FIG. 9 to 1.5×P2. An interval between the column-direction-wire expansion portion 312 of the column-direction wire 31 and the row-direction-wire expansion portion 212 of the row-direction wire 21 in plan view is expanded from P1 in FIG. 9 to 1.5×P1.

Such expansion of the wire-end expansion portion 22A causes an increase in coupling between the column-direction wire 31 and the wire-end expansion portion 22A, and thus an offset of mutual capacitance between the wire-end expansion portion 22A and the column-direction wire 31 easily occurs. However, the adjustment by expanding the interval between the row-direction wire 21 and the column-direction wire 31 in plan view as described above can reduce the offset of the mutual capacitance. An offset of self-capacitance of the column-direction wire 31 due to the wire-end expansion portion 22A can be reduced more than that in the first preferred embodiment, depending on the adjustment.

In the second preferred embodiment described above, the conductor wires, which form the meshes of the row-direction wires 21 and the column-direction wires 31, each have a width of 3 μm, and the disconnection portions each have a disconnection interval of 10 μm. Also in this preferred embodiment, the transparent substrate 10 has a thickness of 0.7 mm, and the interval P1 in the row direction of the mesh and the interval P2 in the column direction of the mesh are each 200 μm.

This preferred embodiment shows the configuration including both of the wire-end expansion portion 22A and the wire-end expansion portion 32A, but a configuration may include only one of them. Priority is preferably given to disposing such a wire-end expansion portion that shields an electric field occurring between wiring extending in the direction of the length of the touch screen 1 in plan view and the inner edge of the opening in the front frame 9. This corresponds to a configuration including only the wire-end expansion portion 32A in the case of this preferred embodiment. Accordingly, priority can be given to protecting wiring in which an offset of capacitance is most likely to occur.

The row-direction wire 21 and the column-direction 31 each have the mesh structure, allowing to cover a wider detectable area with a smaller wiring area and to reduce parasitic capacitance of the wiring. This can also suppress occurrence of moiré fringes.

In this preferred embodiment, the wiring has the mesh structure in which the conductor wires extending in the first direction at the angle of 45° with respect to the row direction and the conductor wires extending in the second direction opposite to the first direction at the angle of 45° with respect to the row direction are repeatedly disposed. A mesh structure may be formed of curved lines such as circular arcs, for example. This case still has the effects of this preferred embodiment.

Transparent conductive materials such as ITO and graphene or metal materials such as aluminum, chromium, copper, and silver may be used as materials for the row-direction wires 21 and the column-direction wires 31. The row-direction wires 21 and the column-direction wires 31 may be made of an alloy of aluminum, chromium, copper, silver, and the like, or may have a multilayer structure in which aluminum nitride is formed on the alloy. The conductor wire width and the mesh interval may have different values from those in this preferred embodiment according to the use of the touch screen.

<Effects>

Next, the effects of reducing an offset of mutual capacitance by providing the wire-end expansion portion 22A and the wire-end expansion portion 32A are described. To confirm the effects, a sample of a liquid crystal display on which a touch screen including 10 row-direction wires R1 to R10 and 14 column-direction wires C1 to C14 is mounted is manufactured, the liquid crystal display including a front frame that has conductivity and is grounded. Then, mutual capacitance of each wire of the touch screen is measured.

A sample of a liquid crystal display in which intervals between the row-direction wires 21 and the column-direction wires 31 in the unit cells in the region B and the region C in FIG. 2 are set to be the same as those in FIGS. 8 and 9 is similarly manufactured for comparison purpose.

Figure 14:
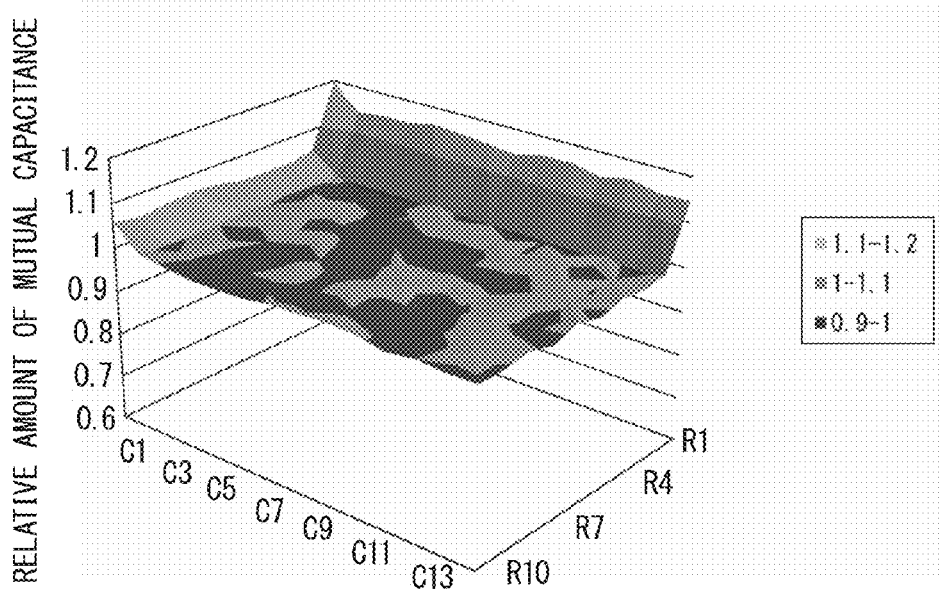
FIG. 14 is a diagram showing mutual capacitance of a touch screen in a comparative example.

FIG. 14 shows a distribution of relative values of mutual capacitance between the row-direction wires R1 to R10 and the column-direction wires C1 to C14 of the touch screen in the comparative example. The relative value of mutual capacitance represents a relative value in a case where mutual capacitance of a unit cell formed of the row-direction wire R5 and the column-direction wire C7 of the touch screen in the comparative example is set to be 1. FIG. 14 indicates the relative values of mutual capacitance in three types of ranges, which are 0.9 to 1, 1 to 1.1, and 1.1 to 2, by a shade of color.

As shown in FIG. 14, in the comparative example, the unit cells formed of the row-direction wires R2 to R10 and the column-direction wires C1 to C14 have almost equal relative values of mutual capacitance of approximately 1. However, all of the unit cells formed of the row-direction wire R1 located on the outermost side and the column-direction wires C2 to C14 have the relative values of mutual capacitance of approximately 1.15, which is offset, and all of the unit cells formed of the column-direction wire C1 located on the outermost side and the row-direction wires R2 to R10 have the relative values of mutual capacitance of approximately 1.05, which is offset.

Figure 15:
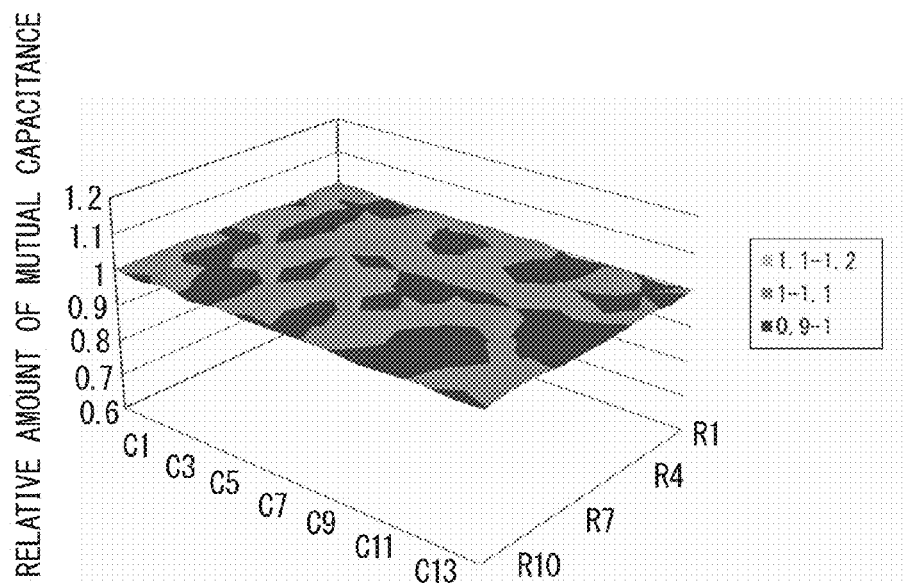
FIG. 15 is a diagram showing mutual capacitance of the touch screen in the second preferred embodiment according to the present invention.

FIG. 15 shows a distribution of relative values of mutual capacitance between the row-direction wires R1 to R10 and the column-direction wires C1 to C14 of the touch screen in this preferred embodiment. The relative value of mutual capacitance represents a relative value in a case where mutual capacitance of a unit cell formed of the row-direction wire R5 and the column-direction wire C7 of the touch screen in this preferred embodiment is set to be 1. FIG. 15 indicates the relative values of mutual capacitance in three types of ranges, which are 0.9 to 1, 1 to 1.1, and 1.1 to 2, by a shade of color.

As shown in FIG. 15, in the touch screen in this preferred embodiment, all of the unit cells including the unit cell along the row-direction wire R1 and the column-direction wire C1 located on the outermost side have almost equal relative values of mutual capacitance of approximately 1.

As described above, the intervals between the row-direction wires 21 and the column-direction wires 31 in the unit cells in the edge region of the column-direction wires 31 and the edge region of the row-direction wires 21 are expanded more than those in the unit cells in the other regions, so that the offset of mutual capacitance due to the column-direction wire 31 located on the outermost side and the row-direction wire 21 located on the outermost side can be reduced.

Third Preferred Embodiment

Figure 16:
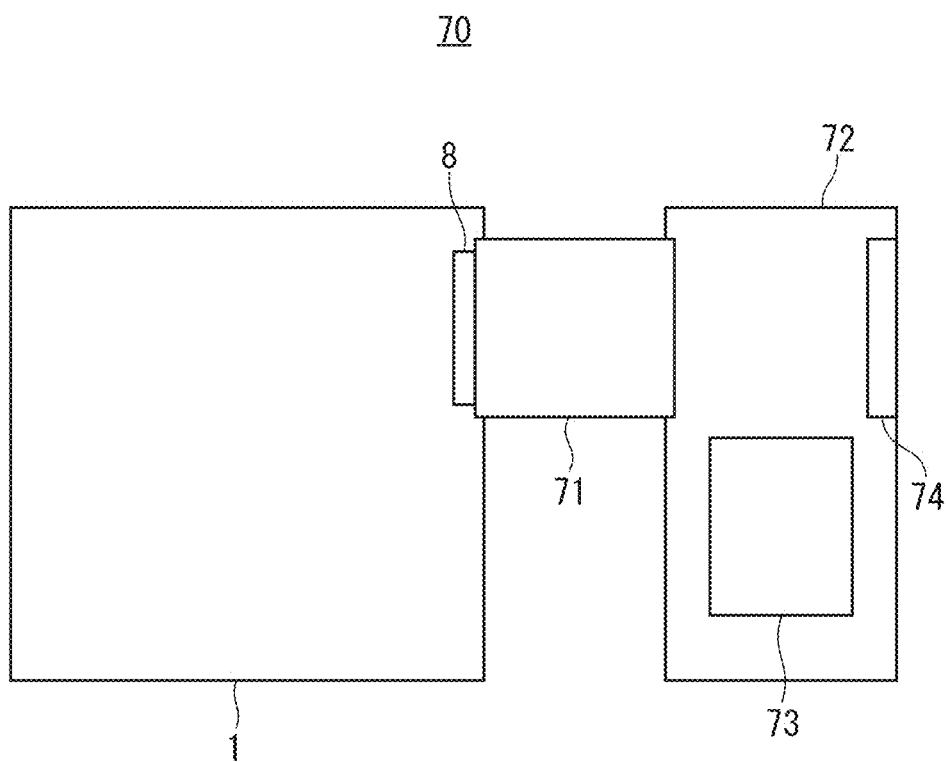
FIG. 16 is a plan view schematically showing a configuration of a touch panel according to the present invention.

FIG. 16 is a plan view schematically showing a configuration of a touch panel 70 in a third preferred embodiment according to the present invention. The touch panel 70 includes the touch screen 1 of the first preferred embodiment shown in FIG. 1, a flexible printed board 71, and a controller board 72.

A terminal 8 of the touch screen 1 is connected to the flexible printed board 71 on which a terminal (corresponding to the terminal 8) is mounted by using an anisotropic conductive film (ACF).

The end portions of the row-direction wires 21 and the column-direction wires 31 of the touch screen 1 are electrically connected to the controller board 72 through the flexible printed board 71. Thus, the touch screen 1 functions as a main structural component of the touch panel 70.

A detection processing circuit 73 is installed on the controller board 72. The detection processing circuit 73 detects touch capacitance composed of capacitance formed between an indicator and wiring by application of signal voltage, and performs calculation processing of the touch position of the indicator on the touch screen 1 based on the detection result.

The detection processing circuit 73 (touch position detection circuit) is installed on the controller board 72. The detection processing circuit 73 detects, as the touch capacitance, the capacitance occurring between the indicator and one of the row-direction wire 21 and the column-direction wire 31 by the application of the signal voltage, and performs the calculation processing of the touch position of the indicator on the touch screen 1 based on the detection result. In other words, the detection processing circuit 73 detects a position indicated by the indicator on the touch screen 1 based on the capacitance between the indicator indicating the touch screen 1 and the row-direction wire 21 and the column-direction wire 31.

The detection processing circuit 73 can use a projected capacitive detection logic. The controller board 72 includes an external connection terminal 74 for outputting the touch position calculated by the detection processing circuit 73 to an external processing device.

As described above, in the third preferred embodiment, the touch panel 70 includes the touch screen 1 (FIG. 1) of the first preferred embodiment to reduce coupling occurring between the outermost lead-out wire of the touch screen 1 and a display module such as an LCD and to suppress an offset of capacitance of the sensor capacitor due to the coupling. Consequently, the touch panel 70 in which unevenness of sensitivity to detection of capacitance is reduced can be obtained.

The case in which the touch screen of the first preferred embodiment is used is described above, which is not restrictive. In the case in which the touch screen of the second preferred embodiment is used, the same effects can be obtained.

The detection processing circuit 73 is mounted on the controller board 72, which is not restrictive. The detection processing circuit 73 may be mounted on the transparent substrate 10 of the touch screen 1.

Fourth Preferred Embodiment

A display in a fourth preferred embodiment of the present invention includes the above-mentioned touch panel 70 shown in FIG. 16 and a display module such as an LCD capable of displaying information. The touch panel 70 is disposed closer to the user than a display screen of the display module is. In other words, the display module is disposed opposite to the side from which the touch screen of the touch panel 70 is indicated. With this configuration, the display equipped with the touch panel having the function of detecting a touch position indicated by a user can be obtained.

As described above, the display in this preferred embodiment includes the touch panel 70 in which unevenness of sensitivity to detection of capacitance is reduced, and thus the display equipped with the touch panel in which unevenness of sensitivity of detection of capacitance is reduced can be obtained.

Fifth Preferred Embodiment

An electronic apparatus in a fifth preferred embodiment according to the present invention includes the touch panel 70 (FIG. 16) of the third preferred embodiment, a display module such as an LCD, and a signal processing device (electronic processing unit) being an electronic device, which is not shown.

The signal processing device inputs a signal output from the external connection terminal 74 of the touch panel 70 and outputs the signal as a digital signal. In other words, the signal processing device electronically performs predetermined processing on information of a touch position detected by the detection processing circuit 73 of the touch panel 70. By connecting the signal processing device to the touch panel 70 in this manner, the electronic apparatus with the touch position detection function, such as a digitizer, that outputs information of the touch position detected by the detection processing circuit 73 of the touch panel 70 to an external signal processing device, such as a computer, can be obtained.

The signal processing device may be built in (installed on) in the controller board 72 of the touch panel 70. In this case, a versatile electronic apparatus with the touch position detection function can be achieved by the signal processing device with an output function that meets standards of a bus such as a universal serial bus (USB).

As described above, the electronic apparatus in this preferred embodiment includes the touch panel 70 in which unevenness of sensitivity to detection of capacitance is reduced, and thus a projected capacitive electronic apparatus with the touch position detection function in which unevenness of sensitivity to detection of capacitance is reduced can be obtained.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch screen, comprising:
  a column-direction wire extending in a column direction; and
  a row-direction wire extending in a row direction orthogonal to said column direction,
  said column-direction wire and said row-direction wire three-dimensionally intersecting each other in a region that is a detection cell, wherein
  at least one of said column-direction wire and said row-direction wire has an end portion whose width is larger than a width of another portion of the wire, said end portion being a wire-end expansion portion,
  said wire-end expansion portion is provided so as to be located outside an edge of an outermost column-direction wire and an outermost row-direction wire that are disposed on the outermost side of a detectable area formed of a plurality of said column-direction wires and a plurality of said row-direction wires,
  said column-direction wire and said row-direction wire each have a mesh structure in which a plurality of conductor wires are disposed in a mesh pattern,
  said wire-end expansion portion has said mesh structure,
  said column-direction wire and said row-direction wire each have a maximum width set to be smaller than a corresponding arrangement interval of said column-direction wire and said row-direction wire in said detectable area, and
  said wire-end expansion portion has a width set to be larger than said maximum width of said column-direction wire and said maximum width of said row-direction wire.

2. The touch screen according to claim 1, wherein
  said column-direction wire and said row-direction wire respectively have a column-direction-wire expansion portion and a row-direction-wire expansion portion that are formed by partially expanding widths of said column-direction wire and said row-direction wire in said detection cell,
  said column-direction-wire expansion portion and said row-direction-wire extension portion are provided in a portion except for the portion in which said column-direction wire and said row-direction wire three-dimensionally intersect each other,
  said column-direction-wire expansion portion and said row-direction-wire expansion portion have a first interval therebetween,
  said column-direction-wire expansion portion and said row-direction wire has a second interval therebetween, and
  in said detectable area, said first interval and said second interval are set to be greater in said detection cell formed of said outermost column-direction wire and said detection cell formed of said outermost row-direction wire than those in said detection cell in another portion.

3. The touch screen according to claim 1, wherein
  said mesh structure is formed of first conductor wires and second conductor wires that repeatedly intersect each other, said first conductor wires extending in a first direction at an angle of 45° with respect to said column direction or said row direction, said second conductor wires extending in a second direction opposite to the first direction at an angle of 45° with respect to said column direction or said row direction, and
  a repeated interval of the mesh in said row direction and a repeated interval of the mesh in said column direction are set to be the same.

4. The touch screen according to claim 1, wherein said wire-end expansion portion comprises the same material as that for said column-direction wire and said row-direction wire.

5. A touch panel, comprising:
  the touch screen according to claim 1; and
  a touch position detection circuit detecting a position indicated by an indicator on said touch screen based on capacitance between said indicator indicating said touch screen and said row-direction wire and said column-direction wire.

6. A display, comprising:
  the touch panel according to claim 5; and
  a display module that is disposed opposite to the side from which said touch screen of said touch panel is indicated and is capable of displaying information.

7. An electronic apparatus, comprising:
  the touch panel according to claim 5; and
  an electronic processing unit electrically performing predetermined processing on information of said position detected by said touch position detection circuit of said touch panel.

8. A touch screen, comprising:
  a column-direction wire extending in a column direction; and
  a row-direction wire extending in a row direction orthogonal to said column direction,
  said column-direction wire and said row-direction wire three-dimensionally intersecting each other in a region that is a detection cell, wherein
  at least one of said column-direction wire and said row-direction wire has an end portion-being a wire-end expansion portion, and further has, within said detection cell, a first portion having a first width and a second portion having a maximum width greater than the first width,
  said wire-end expansion portion is provided so as to be located outside an edge of an outermost column-direction wire and an outermost row-direction wire that are disposed on the outermost side of a detectable area formed of a plurality of said column-direction wires and a plurality of said row-direction wires such that said wire-end expansion portion is outside any detection cell formed by said plurality of said column-direction wires and said plurality of said row-direction wires, said wire-end expansion portion has a width greater than said maximum width, said wire-end expansion portion reduces an offset of capacitance of at least one orthogonal wire located on an outermost side of the detectable area, said column-direction wire and said row-direction wire each have a mesh structure in which a plurality of conductor wires are disposed in a mesh pattern, said wire-end expansion portion has said mesh structure, said column-direction wire and said row-direction wire each have a maximum width set to be smaller than a corresponding arrangement interval of said column-direction wire and said row-direction wire in said detectable area, and said wire-end expansion portion has a width set to be larger than said maximum width of said column-direction wire and said maximum width of said row-direction wire.

9. A touch screen, comprising:

a column-direction wire extending in a column direction; and a row-direction wire extending in a row direction orthogonal to said column direction, said column-direction wire and said row-direction wire three-dimensionally intersecting each other in a region that is a detection cell, wherein at least one of said column-direction wire and said row-direction wire has an end portion whose width is larger than a width of another portion of the wire, said end portion being a wire-end expansion portion, said wire-end expansion portion is provided so as to be located outside an edge of an outermost column-direction wire and an outermost row-direction wire that are disposed on the outermost side of a detectable area formed of a plurality of said column-direction wires and a plurality of said row-direction wires, said column-direction wire and said row-direction wire each have a mesh structure in which a plurality of conductor wires are disposed in a mesh pattern, said wire-end expansion portion has said mesh structure, said touch screen further comprises a floating electrode that is provided so as to surround each of said column-direction wire and said row-direction wire in plan view, is electrically insulated from said column-direction wire and said row-direction wire, and has a potential in a floating state, and said floating electrode has said mesh structure and is also provided so as to surround said wire-end expansion portion in plan view.

\* \* \* \* \*